(12) United States Patent
Fujiwara

(10) Patent No.: US 12,024,279 B2
(45) Date of Patent: Jul. 2, 2024

(54) MOTOR-INTEGRATED FLUID MACHINE AND VERTICAL TAKEOFF AND LANDING AIRCRAFT

(71) Applicant: MITSUBISHI HEAVY INDUSTRIES, LTD., Tokyo (JP)

(72) Inventor: Naoaki Fujiwara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 434 days.

(21) Appl. No.: 17/421,229

(22) PCT Filed: Jan. 14, 2020

(86) PCT No.: PCT/JP2020/000806
§ 371 (c)(1),
(2) Date: Jul. 7, 2021

(87) PCT Pub. No.: WO2020/158361
PCT Pub. Date: Aug. 6, 2020

(65) Prior Publication Data
US 2022/0081109 A1    Mar. 17, 2022

(30) Foreign Application Priority Data

Jan. 30, 2019   (JP) ................................. 2019-014619

(51) Int. Cl.
*B64C 29/00*      (2006.01)
*B64D 27/24*      (2024.01)
*H02K 21/24*      (2006.01)

(52) U.S. Cl.
CPC .............. *B64C 29/00* (2013.01); *B64D 27/24* (2013.01); *H02K 21/24* (2013.01)

(58) Field of Classification Search
CPC ......... H02K 21/24; B64D 27/24; B64C 29/00
See application file for complete search history.

(56) References Cited

U.S. PATENT DOCUMENTS

| 7,032,861 B2 | 4/2006 | Sanders, Jr. et al. |
| 2015/0226086 A1* | 8/2015 | Samuelson ............ B64D 29/04 |
| | | 415/121.3 |

(Continued)

FOREIGN PATENT DOCUMENTS

| DE | 203 15 369 | 1/2004 |
| JP | 59-223598 | 12/1984 |
| JP | 2017-109726 | 6/2017 |

OTHER PUBLICATIONS

International Search Report issued Mar. 24, 2020 in International (PCT) Application No. PCT/JP2020/000806.

(Continued)

*Primary Examiner* — Jue Zhang
(74) *Attorney, Agent, or Firm* — WENDEROTH, LIND & PONACK, L.L.P.

(57) ABSTRACT

The motor-integrated fan has a suction port and a blowing port, and includes a rotating part rotatably supported on a shaft part; and a peripheral drive motor that rotates the rotating part by applying motive power from a duct provided on an outer peripheral side of the shaft part. The motor includes: a permanent magnet on a rotation support ring connected to the outer peripheral side of a blade of the rotating part; and a coil facing the permanent magnet in the axial direction of a rotational axis. In a cross-section taken on a plane orthogonal to the circumferential direction of the rotational axis, the center of gravity of a free end side portion including at least one of the rotation support ring and the permanent magnet is positioned closer to the suction port in the axial direction than the center of gravity of the thrust applied to the blade.

7 Claims, 3 Drawing Sheets

(56) References Cited

U.S. PATENT DOCUMENTS

2016/0152327 A1* 6/2016 Bertels .................. F03B 11/02
  415/121.3
2017/0104385 A1 4/2017 Salamon et al.

OTHER PUBLICATIONS

Extended European Search Report issued Jan. 14, 2022 in corresponding European Patent Application No. 20749519.3.

* cited by examiner

MOTOR-INTEGRATED FLUID MACHINE AND VERTICAL TAKEOFF AND LANDING AIRCRAFT

TECHNICAL FIELD

The present invention relates to a motor-integrated fluid machine and a vertical takeoff and landing aircraft.

BACKGROUND ART

In the related art, there is known a ring motor including a stator, a rotor, and a plurality of propeller blades (for example, refer to PTL 1). The stator includes a stator support ring, and a plurality of windings that are disposed in a circumferential direction of the stator support ring. A plurality of pitch blades are joined to the stator support ring. The rotor includes a rotor support ring, a plurality of magnetic poles disposed in the circumferential direction of the rotor support ring, and a central hub. The central hub is joined to a portion of the stator. The plurality of propeller blades are joined to the rotor support ring. For this reason, by virtue of the windings and the magnetic poles, the rotor rotates around the central hub joined to the stator, so that the plurality of propeller blades rotate.

CITATION LIST

Patent Literature

[PTL 1] Japanese Unexamined Patent Application Publication No. 2017-109726

SUMMARY OF INVENTION

Technical Problem

By the way, in a motor-integrated fluid machine such as the ring motor of PTL 1, when blades rotate to generate thrust, the generated thrust acts on the blades. Au this time, since a plurality of the blades are supported on a shaft portion such as a hub, a tip side (free end side) of the blades is displaced by the thrust. When the blades are displaced, a rotating support ring is displaced in an axial direction of a rotation axis with the displacement of the blades, so that a plurality of magnetic poles provided in the rotating support ring are also offset in position with respect to a plurality of windings. For example, when a gap between the magnetic pole and the winding widened due to deviation in positional relationship between the plurality of magnetic poles and the plurality of windings, the performance of a motor deteriorates, thus resulting in a decrease in thrust.

Therefore, an object of the present invention is to provide a motor-integrated fluid machine and a vertical takeoff and landing aircraft capable of suppressing deterioration in performance of a motor, which is due to the rotation of blades.

Solution to Problem

According to an aspect of the present invention, there is provided a motor-integrated fluid machine that suctions a fluid from a suction port and discharges the suctioned fluid from a discharge outlet, the machine including: a shaft portion provided at a center of a rotation axis; a rotating portion that rotates around the shaft portion; an outer peripheral portion provided on an outer periphery of the shaft portion; and a motor that rotates the rotating portion. The rotating portion is rotatably supported on the shaft portion, so that a shaft portion side is a fixed end side and an outer peripheral portion side is a free end side. The motor is an outer peripheral drive motor that applies power from the outer peripheral portion to rotate the rotating portion. The rotating portion includes a plurality of blades provided side by side in a circumferential direction of the rotation axis, and a rotating outer peripheral portion provided on an outer peripheral side of the plurality of blades. The motor includes a rotor side magnet provided in the rotating outer peripheral portion, and a stator side magnet provided in the outer peripheral portion to face the rotor side magnet. In a cross section cut along a plane orthogonal to the circumferential direction of the rotation axis, a center of gravity of a portion on the free end side, which includes at least one of the rotating outer peripheral portion and the rotor side magnet, is located on a suction port side in an axial direction of the rotation axis with respect to a center of thrust applied to the plurality of blades.

According to the configuration, when the rotating portion rotates around the shaft portion, centrifugal force is applied to the portion on the free end side, and thrust is applied to the blade. At this time, since the center of gravity of the portion on the free end side is located on the suction port side with respect to the center of the thrust of the plurality of blades, momentum generated by the centrifugal force having the length between the center of gravity and the center of the thrust as the length of an arm is generated. The momentum generated by the centrifugal force acts as momentum opposing the momentum generated by the thrust. For this reason, it can be suppressed that the position of the free end portion is displaced to the suction port side by the thrust. Accordingly, it can be suppressed that the rotor side magnet and the stator side magnet of the motor are separated from each other to widen a gap therebetween, and deterioration in performance of the motor, which is due to the rotation of the blades, can be suppressed.

In addition, it is preferable that the rotor side magnet and the stator side magnet are provided to face each other in the axial direction of the rotation axis.

According to the configuration, even when the rotor side magnet and the stator side magnet are provided to face each other in the axial direction, deterioration in performance of the motor, due to the rotation of the blades, can be suppressed.

In addition, it is preferable that the rotor side magnet and the stator side magnet are provided to face each other in a radial direction of the rotation axis.

According to the configuration, even when the rotor side magnet and the stator side magnet are provided to face each other in the radial direction, deterioration in performance of the motor, which is due to the rotation of the blades, can be suppressed.

In addition, it is preferable that the portion on the free end side is the rotor side magnet.

According to the configuration, for example, when a permanent magnet having a heavy specific gravity is used as the rotor side magnet, the position of the permanent magnet can be changed to easily adjust the center of gravity.

In addition, it is preferable that a position of the rotor side magnet is displaced to the suction port side with respect to the plurality of blades, so that the center of gravity of the rotor side magnet is located on the suction port side with respect to the center of the thrust applied to the plurality of blades.

According to the configuration, the position of the rotor side magnet may be changed without changing the positional relationship between the blade and the rotating outer peripheral portion. For this reason, a change in position of the blade, which affects thrust, is not made. Therefore, the influence on design related to thrust can be suppressed.

In addition, it is preferable that the blade is a wing body made of a composite material.

According to the configuration, since a composite material is used, the mass of the blade can be reduced. For this reason, the thrust can be reduced by the amount by which the mass of the blade can be reduced, so that the required torque can be reduced. Therefore, the weights of the rotor side magnet and the stator side magnet can be reduced.

According to another aspect of the present invention, there is provided a vertical takeoff and landing aircraft including: the motor-integrated fluid machine; and an airframe that is moved by thrust generated from the motor-integrated fluid machine.

According to the configuration, it is possible to provide the vertical takeoff and landing aircraft that having stable thrust due to being equipped with the motor-integrated fluid machine that suppresses deterioration is performance of the motor, which is due to the rotation of the blades.

DESCRIPTION OF EMBODIMENTS

Hereinafter, embodiments according to the present invention will be described in detail with reference to the drawings. Incidentally, the invention is not limited by the embodiments. In addition, the components in the following embodiments include components that can be easily replaced by those skilled in the art, or components that are substantially the same. Further, the components to be described below can be appropriately combined, and when there are a plurality of embodiments, the embodiments can be combined.

Embodiment

A motor-integrated fluid machine according to the present embodiment is an axial fluid machine. The motor-integrated fluid machine is a motor integrated fan 1 (hereinafter, also simply referred to as a fan 1) that takes in air from a suction port and discharges the air from a discharge outlet, thus to generate thrust. Incidentally, in the first embodiment, the motor-integrated fan 1 will be described as an application of the motor-integrated fluid machine, and the motor-integrated fluid machine is not limited to the configuration. The motor-integrated fluid machine may be applied, for example, as a motor-integrated thruster such as a propeller which takes in a liquid such as water or seawater from a suction port to inject the liquid from a discharge outlet, thus to generate thrust.

The motor-integrated fan 1 is provided in, for example, a vertical takeoff and landing aircraft such as a helicopter or a drone. The motor-integrated fan 1 provided in the vertical takeoff and landing aircraft generates thrust for lifting an airframe, or generates thrust for controlling the posture of the airframe. Incidentally, the motor-integrated fan 1 may be applied to, for example, an air cushion vehicle such as a hovercraft. Further, when the motor-integrated fan 1 is applied as a motor-integrated thruster, the motor-integrated fan 1 may be applied to ships.

Figure 1:
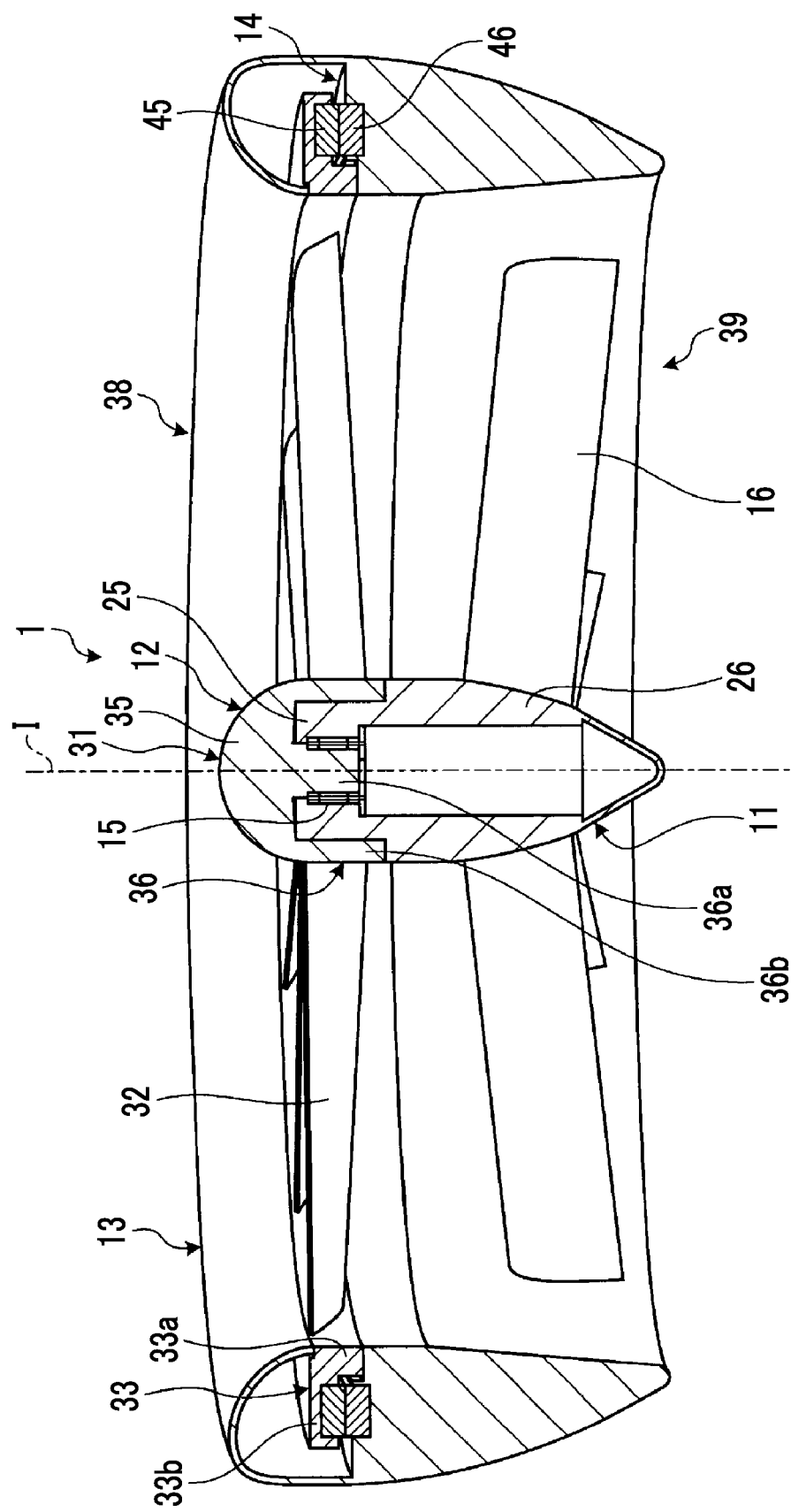
FIG. 1 is a cross-sectional view of a motor-integrated fan according to the present embodiment.

The motor-integrated fan 1 will be described with reference to FIG. 1. FIG. 1 is a cross-sectional view of the motor-integrated fan according the present embodiment. The motor-integrated fan 1 is called a duct-type propeller or a duct fan. The motor-integrated fan 1 is used, for example, in a horizontal state in which an axial direction of a rotation axis I is a vertical direction, and takes in air from an upper side in the vertical direction and discharges the air to a lower side in the vertical direction. Incidentally, the motor-integrated fan 1 may be used in a vertical state in which the axial direction of the rotation axis I is a horizontal direction.

The motor-integrated fan 1 is a flat fan of which the length in the axial direction of the rotation axis I is shorter than the length is a radial direction of the rotation axis I. The motor-integrated fan 1 is a fan in which one motor is integrally provided, and includes a shaft portion 11, a rotating portion 12, an outer peripheral portion 13, a motor 14, a rolling bearing 15, and a guide vane 16.

The shaft portion 11 is provided at the center of the rotation axis I. and is a support system. (fixed side). The axial direction of the rotation axis I is an upward and downward direction in FIG. 1, and is a direction along the vertical direction. For this reason, a flow direction of air is a direction along the axial direction of the rotation axis I, and the air flows from an upper side toward a lower side in FIG. 1. The shaft portion 11 includes a shaft side fitting portion 25 that is a portion provided on an upstream side in the axial direction of the rotation axis I, and a shaft body 26 that is a portion provided downstream of the shaft side fitting portion 25.

A hub 31 of the rotating portion 12 to be described later is fitted to the shaft side fitting portion 25. The shaft side fitting portion 25 has a cylindrical shape, and is provided to protrude from an end surface on the upstream side of the shaft body 26 in the axial direction. A space having a columnar shape is formed on a center side of the rotation axis I in the shaft side fitting portion 25. A part of the hub 31 of the rotating portion 12 is inserted into the space. In addition, an outer peripheral side of the shaft side fitting portion 25 is surrounded by a part of the hub 31 of the rotating portion 12.

The shaft body 26 has a substantially conical shape that is tapered from the upstream side toward a downstream side in the axial direction. For this reason, an outer peripheral surface of the shaft body 26 is a surface that approaches an inner side from an outer side in the radial direction as the surface extends from the upstream side toward the downstream side in the axial direction. An internal space in which a device can be installed is formed inside the shaft body 26. Examples of the device include a control device, a camera and the like. In addition, an end portion on the radial inner side of the guide vane 16 is connected to the outer peripheral surface of the shaft body 26.

Figure 2:
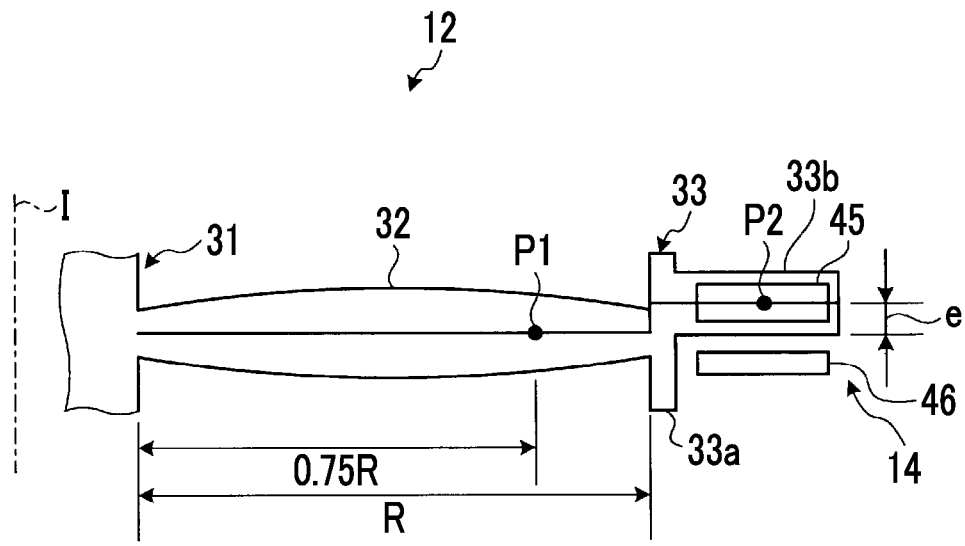
FIG. 2 is a cross-sectional view schematically illustrating a periphery of a blade of the motor-integrated fan according to the present embodiment.

As illustrated in FIGS. 1 and 2, the rotating portion. 12 is a rotating system (rotating side) that rotates around the shaft portion 11. FIG. 2 is a cross-sectional view schematically illustrating a periphery of a blade of the motor-integrated fan according to the present embodiment. The rotating portion 12 is provided on an inlet side, into which air flows, with respect to the shaft portion 11 in the axial direction of the rotation axis I. The rotating portion 12 includes the hub 31, a plurality of blades 32, and a rotating support ring (rotating outer peripheral portion) 33.

The hub 31 is provided upstream of the shaft portion 11 in the axial direction, and is rotatably fitted to the shaft side fitting portion 25. The hub 31 includes a hub body 35 that is a portion provided on the upstream side in the axial direction, and a hub side fitting portion 36 that is a portion provided downstream of the hub body 35. The hub body 35 is formed such that an end surface on the upstream side is a hemispherical surface having a predetermined radius of curvature. The hub side fitting portion 36 has a shape complementary to that of the shaft side fitting portion 25. The hub side fitting portion 36 includes a central shaft 36a provided at the center of the rotation axis, and a cylindrical portion 36b that has a cylindrical shape and is provided on an outer peripheral side of the central shaft 36a. The central shaft 36a is inserted into the space of the shaft side fitting portion 25, the space being formed at the center of the rotation axis. The cylindrical portion 36b is provided to protrude from an end surface on the downstream side of the hub body 35 in the axial direction. The cylindrical portion 36b is disposed to surround an outer periphery of the shaft side fitting portion 25. At this time, the rolling bearing 15 is provided between an inner peripheral surface of the shaft side fitting portion 25 and an outer peripheral surface of the central shaft 36a of the hub 31.

Then, a surface extending from an end surface of the hub body 35 to the outer peripheral surface of the shaft body 26 via an outer peripheral surface of the cylindrical portion. 36b is a surface that is smooth without a step.

The plurality of blades 32 are provided to extend from the hub 31 toward the radial outer side, and are provided side by side at predetermined intervals in a circumferential direction. Each of the blades 32 has an airfoil shape. The plurality of blades 32 are made of a composite material. Incidentally, in the present embodiment, the plurality of blades 32 are made of a composite material; however, the material is not particularly limited, and the plurality of blades 32 may be made of, for example, a metallic material.

The rotating support ring 33 is formed in an annular shape centered on the rotation axis I. The rotating support ring 33 is connected to an outer peripheral side of the plurality of blades 32 in the radial direction of the rotation axis I. The rotating support ring 33 includes an inner annular portion 33a that is a portion forming a part of an inner peripheral surface of the outer peripheral portion 13 to be described later, and a flange portion 33b that is a portion provided to protrude to the radial outer side of the inner annular portion. 33a. An inner peripheral surface on the radial inner side of the inner annular portion 33a is a part of the inner peripheral surface of the outer peripheral portion 13. In addition, an end portion on the radial outer side of each of the blades 32 is connected to the inner peripheral surface of the inner annular portion 33a. The flange portion 33b is provided upstream of the inner annular portion 33a in the axial direction. The flange portion. 33b holds a permanent magnet 45 of the motor 14 to be described later. The flange portion 33b holds the permanent magnet 45 such that the permanent magnet 45 faces the downstream side in the axial direction.

The rotating portion 12 is configured such that the hub 31, the plurality of blades 32, and the rotating support ring 33 are integrated, and rotates around the hub 31. In this case, when the rotating portion. 12 is made of a composite material, a part or the entirety of the rotating portion 12 may be integrally molded. For example, in the rotating portion 12, the plurality of blades 32 and the rotating support ring 33 may be integrally molded of a composite material, or the hub 31, the plurality of blades 32, and the rotating support ring 33 are integrally molded of a composite material. In addition, the rotating portion 12 may be made of a metallic material, and also in this case, a part or the entirety of the rotating portion 12 may be integrated.

The outer peripheral portion 13 is provided outside the shaft portion 11 in the radial direction, and is the support system (fixed side). The outer peripheral portion 13 is a duct that is formed in an annular shape, and is caused to generate thrust by the rotation of the rotating portion 12. In the outer peripheral portion 13 (hereinafter, referred to as the duct 13), an opening on the upstream side in the axial direction of the rotation axis I is a suction port 38, and an opening on the downstream side is a discharge outlet 39. In addition, the duct 13 has a shape in which when the rotating portion 12 rotates, air is suctioned from the suction port 38, and the suctioned air is discharged from the discharge outlet 39 to generate thrust. Specifically, the inner peripheral surface of the duct 13 on the downstream side of the rotating portion 12 is a surface that is widened from the suction port 38 side toward the discharge outlet 39 side.

An internal space, which has an annular shape and accommodates the flange portion 33b of the rotating support ring 33 of the rotating portion 12 and a coil 46 of the motor 14 to be described later, is formed inside the duct 13. The duct 13 holds the coil 46 thereinside, the col 46 being provided at a position facing the permanent magnet 45 held by the rotating portion 12.

The motor 14 is an outer peripheral drive motor that applies power from a duct 13 side toward the rotating portion 12 to cause the rotating portion 12 to rotate. The motor 14 includes a rotor side magnet provided on a rotating portion 12 side, and a stator side magnet provided on the duct 13 side. In the first embodiment, the rotor side magnet is the permanent magnet 45, and the stator side magnet is the coil 46 which is an electromagnet.

The permanent magnets 45 are provided to be held by the flange portion 33b of the rotating support ring 33, and are disposed in an annular shape in the circumferential direction. In addition, the permanent magnets 45 are configured such that positive poles and negative poles alternate at predetermined intervals in the circumferential direction. Incidentally, the permanent magnets 45 may be in a Halbach array. The permanent magnet 45 is provided at a position facing the coil 46 in the axial direction of the rotation axis I. The length of the permanent magnet 45 in the radial direction of the rotation axis I is longer than the length thereof in the axial direction of the rotation axis I. Incidentally, a specific disposition of the permanent magnet 45 will be described later.

A plurality of the coils 46 are provided to be held inside the duct. 13, to face the poles of the permanent magnets 45, and side by side in the circumferential direction. The coil 46 is provided at the position facing the permanent magnet 45, which is held by the rotating portion 12, in the axial direction of the rotation axis I. Namely, the permanent magnet 45 and the coil 46 are disposed to face each other in the axial direction of the rotation axis I, which is an axial disposition.

The rolling bearing 15 is provided between the inner peripheral surface of the shaft side fitting portion 25 of the shaft portion 11 and the outer peripheral surface of the central shaft. 36a of the hub 31 of the rotating portion 12. The rolling bearing 15 connects the shaft portion 11 and the rotating portion 12 while allowing the rotating portion 12 to rotate with respect to the shaft portion 11. The rolling bearing 15 is, for example, a ball bearing or the like.

The guide vane 16 is provided to connect the shaft portion 11 and the duct 13. The guide vane 16 is provided downstream of the rotating portion 12 is the axial direction of the rotation axis I. Namely, the guide vane 16 is provided at the position of a downstream portion 43 of the duct 13 in the axial direction. A plurality of the guide vanes 16 are provided side by side is the circumferential direction of the rotation axis I. In addition, the guide vane 16 has a streamlined shape such as an airfoil shape, and rectifies air, which flows from the rotating portion 12, to generate thrust. Incidentally, the shape of the guide vane 16 is not limited to an airfoil shape, and may be a plate shape.

In the motor-integrated fan 1 described above, power generated by a magnetic field is applied from the duct 13 side to the rotating portion 12 by the motor 14, so that the rotating portion 12 rotates. When the rotating portion 12 rotates, the motor-integrated fan 1 suctions air from the suction port 38, and discharges the air toward the discharge outlet 39. The air discharged from the rotating portion 12 flows along the inner peripheral surface of the duct 13 to generate thrust. At this time, the flow of the air is rectified by the guide vanes 16, so that thrust is also generated by the guide vanes 16.

Next, the disposition of the permanent magnet 45 which is the rotor side magnet will be described with reference to FIGS. 2 and 3. When thrust is generated by the rotation of the rotating portion 12, the generated thrust acts on the blade 32 to cause the position of an end portion on a free end side (duct 13 side) of the blade 32 to be displaced. The displacement of the position of the end portion on the duct 13 side of the blade 32 increases with an increase in thrust. In order to suppress the displacement, in the present embodiment, the permanent magnet 45 is disposed as illustrated in FIG. 2.

Here, as illustrated in FIG. 2, the position of the center of thrust applied to the blade is a point P1 in a cross section cut along a plane orthogonal to the circumferential direction of the rotation axis I. When the length of the blade 32 in the radial direction of the rotation axis I is the point P1 is located at a position of approximately 0.75R from an end portion on a shaft portion 11 side (fixed end side). Incidentally, in the present embodiment, the point P1 is located at approximately 0.75R, but is not particularly limited to the position, and the center of thrust applied to the blade 32 may be, for example, the center of gravity of a portion from the end portion on the shaft portion 11 side (fixed end side) of the blade 32 to the duct 13 side.

The position of the center of gravity of the permanent magnet 45 is the position of a point P2 with respect to the position of the point P1 illustrated in FIG. 2. The point P2 is a point located at the center of the permanent magnet 45 in the cross section of the permanent magnet 45 cut along the plane orthogonal to the circumferential direction of the rotation axis I. Incidentally, in the present embodiment, the point P2 is located at the position of the center of the permanent magnet 45, but is not particularly limited to the position, and may be located at the position of the center of gravity of the permanent magnet 45 in the cross section of the permanent magnet 45 cut along the plane orthogonal to the circumferential direction of the rotation axis I. Then, the permanent magnet 45 is disposed in the flange portion 33b of the rotating support ring 33 such that the point P2 is located on the suction port 38 side with respect to the point P1 in the axial direction of the rotation axis I. The length of an offset in position between the point P1 and the point P2 in the axial direction of the rotation axis I is e.

Incidentally, in the present embodiment, the point P2 is located at the position of the center of gravity of the permanent magnet 45, but the point P2 may be the position of the center of gravity of a portion on the free end side, which is a portion including the permanent magnet 45 and located closer to the duct 13 side than the blade 32. Namely, the portion on the free end side is a portion including the permanent magnet 45 and the rotating support ring 33.

Figure 3:
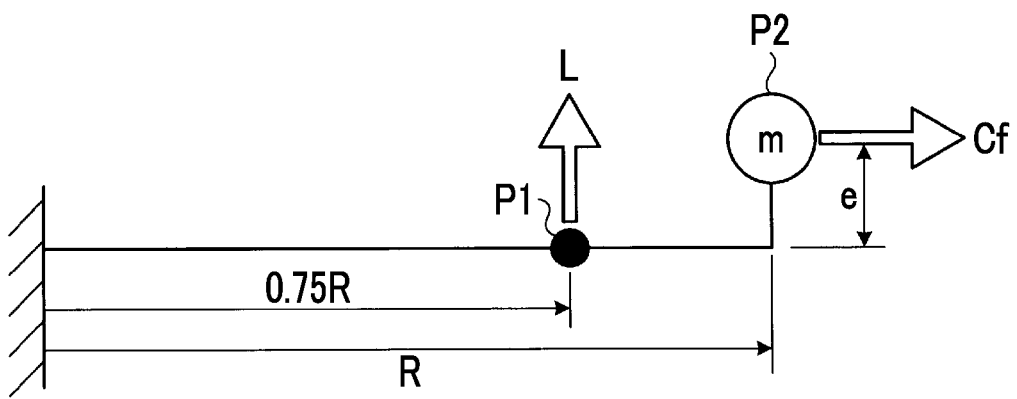
FIG. 3 is a description view illustrating force applied to the blade of the motor-integrated fan according to the present embodiment.

When the permanent magnet 45 is disposed as illustrated in FIG. 2, and the rotating portion 12 rotates, the force illustrated in FIG. 3 is generated in the blade 32, the permanent magnet 45, and the rotating support ring 33. In the figure illustrated in FIG. 3, the end portion on the shaft portion 11 side of the blade 32 is a fixed end, and the end portion on the duct 13 side of the blade 32 is a free end. In addition, a mass m of the permanent magnet 45 is connected to the end portion on the duct 13 side of the blade 32. At this time, the end portion on the duct 13 side of the blade 32 and the mass m of the permanent magnet. 45 are separated from each other by the length e that is an offset in position in the axial direction of the rotation axis I.

In FIG. 3, a thrust L acts on the point P1 of the blade 32. When the momentum generated by the thrust L is ii, the momentum M is 0.75R×L (M=0.75R·L). In addition, a centrifugal force Cf generated by the rotation of the rotating portion 12 acts on the point P2 of the permanent magnet 45. When the momentum generated by the centrifugal force Cf is M', the momentum M' is Cf×e (M'=Cf·e). Here, the centrifugal force Cf acting on the permanent magnet 45 is "Cf=mRω²/g". ω is the rotation angular velocity and g is the acceleration of gravity.

Then, in FIG. 3, when the momentum M and the momentum. M' are balanced. (in the case of M=M"), the displacement of the position of the end portion on the duct 13 side of the blade 32 is zero. Namely, "0.75R·L=mRω²/g·e". Here, when the above-described equation is expanded for the length e, "e=(0.75R·L)/(mRω²/g)" is obtained, and the length e can be derived based on this calculation equation.

Here, when the positional relationship between the point P1 and the point P2 is set such that the length e derived based on the above calculation equation is obtained, the position of the permanent magnet 45 is displaced to the suction port 38 side with respect to the blade 32. Namely, design is performed by displacing the positions of the permanent magnet 45 and the flange portion 33b of the rotating support ring 33 without changing the positions of the plurality of blades 32 and the inner annular portion 33a of the rotating support ring which are designed in advance. For this reason, as illustrated in FIG. 2, when the blade 32 is located at the center of the inner annular portion 33a in the axial direction of the rotation axis I, the permanent magnet 45 and the flange portion 33b are located closer to the suction port 38 side than the center of the inner annular portion 33a in the axial direction of the rotation axis I. In addition, the position of the coil 46 is also displaced according to the displacement of the position of the permanent magnet 45 so as to have an appropriate positional relationship with the permanent magnet 45.

As described above, according to the present embodiment, even when the momentum M generated by the thrust acts on the blade 32, the momentum. M' generated by the centrifugal force acts on the permanent magnet 45. Since the momentum M' acts as momentum opposing the momentum M generated by the thrust, it can be suppressed that the position of the permanent magnet 45 is displaced to the suction port 38 side by the thrust. Accordingly, it can be suppressed that the permanent magnet 45 and the coil 46 of the motor 14 are separated from each other to widen a gap therebetween, and deterioration in performance of the motor 14, which is due to the rotation of the blades 32, can be suppressed.

In addition, according to the present embodiment, the position of the center of gravity of the permanent magnet 45 having a heavy specific gravity can be changed to easily adjust the position of the point P2, namely, the length e.

In addition, according to the present embodiment, since the position of the permanent magnet 45 may be changed without changing the positional relationship between the blade 32 and the inner annular portion 33a, a change in position of the blade 32, which affects thrust, is not made. Therefore, the influence on design related to thrust can be suppressed.

In addition, according to the present embodiment, since a composite material is used, the mass of the blade can be reduced. For this reason, the thrust can be reduced by the amount by which the mass of the blade 32 can be reduced, so that the required torque can be reduced. Therefore, the weights of the permanent magnet 45 and the coil 46 can be reduced.

In addition, according to the present embodiment, it is possible to provide the vertical takeoff and landing aircraft having a stable thrust due to being equipped with the motor-integrated fan 1 that suppresses deterioration in performance of the motor 14, which is due to the rotation of the blades 32.

Incidentally, in addition to the present embodiment, when there is variations in the mass m of the permanent magnet 45 in the circumferential direction, a weight may be added as an adjustment allowance for adjusting the mass m of the permanent magnet 45. The weight is appropriately added to adjust the mass m of the permanent magnet 45, so that during rotation of the rotating portion 12, the gap between the permanent magnet 45 and the coil 46 of the motor 14 can be made uniform.

Figure 4:
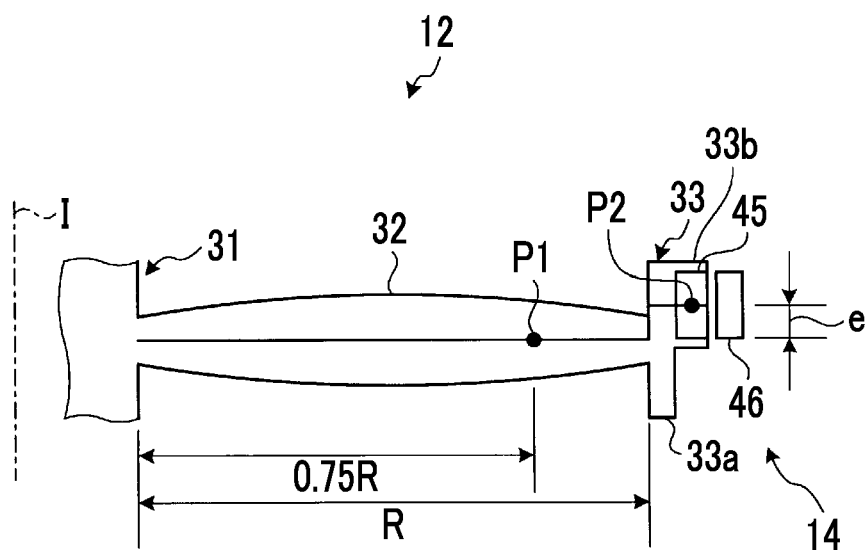
FIG. 4 is a cross-sectional view schematically illustrating a periphery of a blade of a motor-integrated fan according to a modification example of the present embodiment.

In addition, in the present embodiment, the permanent magnet 45 and the coil 46 are disposed to face each other in the axial direction of the rotation axis I, which is an axial disposition, but may be disposed as in a modification example illustrated n FIG. 4. FIG. 4 is a cross-sectional view schematically illustrating periphery of a blade of a motor-integrated fan according to the modification example of the present embodiment. In the modification example illustrated in FIG. 4, the permanent magnet 45 and the coil 46 are disposed to face each other in the radial direction of the rotation axis I, which is a radial disposition.

In the rotating support ring 33 holding the permanent magnet 45, the permanent magnet 45 is held by the flange portion 33b provided Cr the outer peripheral side of the inner annular portion 33a. The flange portion 33b is provided to be located on the suction port 38 side in the axial direction of the rotation axis I.

The permanent magnet 45 is provided on the outer peripheral side of the inner annular portion 33a of the rotating support ring 33, and is held by the flange portion 33b, so that the permanent magnet 45 is located on the suction port 38 side in the axial direction of the rotation axis I. The permanent magnets 45 are disposed in an annular shape in the circumferential direction. The permanent magnet 45 is provided at a position facing the coil 46 in the radial direction of the rotation axis I.

A plurality of the coils 46 are provided to be held inside the duct 13, to face the poles of the permanent magnets 45, and side by side in the circumferential direction. The coil 46 is provided at a position facing the permanent magnet 45, which is held by the rotating portion 12, in the radial direction of the rotation axis I. As described above, the permanent magnet 45 and the coil 46 may be disposed to face each other in the radial direction of the rotation axis I, which is a radial disposition.

In addition, even in the disposition illustrated in FIG. 4, the point P2 at the position of the center of gravity of the permanent magnet 45 is in the same positional relationship as that of the point P2 illustrated in FIG. 2. Namely, the permanent magnet 45 is disposed in the flange portion. 33b of the rotating support ring 33 such that the point P2 illustrated in FIG. 4 is located on the suction port 38 side with respect to the point P1 in the axial direction of the rotation axis I.

REFERENCE SIGNS LIST

1 Motor-integrated fan
11 Shaft portion
12 Rotating portion.
13 Duct
14 Motor
15 Rolling bearing
16 Guide vane
31 Huh
32 Blade
33 Rotating support ring
38 Suction port
39 Discharge outlet
45 Permanent magnet
46 Coil

The invention claimed is:

1. A motor-integrated fluid machine that suctions a fluid from a suction port and discharges the suctioned fluid from a discharge outlet, the machine comprising:
a shaft portion provided at a center of a rotation axis;
a rotating portion that rotates around the shaft portion;
an outer peripheral portion provided on an outer periphery of the shaft portion; and
a motor that rotates the rotating portion,
wherein the rotating portion is rotatably supported on the shaft portion, so that a shaft portion side is a fixed end side and an outer peripheral portion side is a free end side,
the motor is an outer peripheral drive motor that applies power from the outer peripheral portion to rotate the rotating portion,
the rotating portion includes
a plurality of blades provided side by side in a circumferential direction of the rotation axis, and
a rotating outer peripheral portion provided on an outer peripheral side of the plurality of blades, the motor includes
a rotor side magnet provided in the rotating outer peripheral portion, and
a stator side magnet provided in the outer peripheral portion to face the rotor side magnet, and
in a cross section of a portion on the free end side cut along a plane orthogonal to the circumferential direction of the rotation axis, a center of gravity of the portion on the free end side, which includes at least one of the rotating outer peripheral portion and the rotor side magnet, is located on a suction port side in an axial direction of the rotation axis with respect to a center of thrust applied to the plurality of blades.

2. The motor-integrated fluid machine according to claim 1,
   wherein the rotor side magnet and the stator side magnet are provided to face each other in the axial direction of the rotation axis.

3. The motor-integrated fluid machine according to claim 1,
   wherein the rotor side magnet and the stator side magnet are provided to face each other in a radial direction of the rotation axis.

4. The motor-integrated fluid machine according to claim 1,
   wherein the portion on the free end side is the rotor side magnet.

5. The motor-integrated fluid machine according to claim 4,
   wherein a position of the rotor side magnet is displaced to the suction port side with respect to the plurality of blades, so that the center of gravity of the rotor side magnet is located on the suction port side with respect to the center of the thrust applied to the plurality of blades.

6. The motor-integrated fluid machine according to claim 1,
   wherein the blade is a wing body made of a composite material.

7. A vertical takeoff and landing aircraft comprising:
   the motor-integrated fluid machine according to claim 1; and
   an airframe that is moved by thrust generated from the motor-integrated fluid machine.

\* \* \* \* \*